United States Patent [19]

Cherian

[11] Patent Number: 5,495,315
[45] Date of Patent: Feb. 27, 1996

[54] LEVEL SENSING APPARATUS

[75] Inventor: Abraham Cherian, Webster, N.Y.

[73] Assignee: Xerox Corporation, Stamford, Conn.

[21] Appl. No.: 676,025

[22] Filed: Mar. 27, 1991

[51] Int. Cl.⁶ .................................................. G03G 15/08
[52] U.S. Cl. .......................... 355/208; 118/689; 355/245
[58] Field of Search ....................................... 355/245, 246,
355/260, 206–208; 118/653, 691, 689, 656,
657, 694; 222/23, 64, DIG. 1; 260/61.2,
61.21; 310/345, 245

[56] References Cited

U.S. PATENT DOCUMENTS

| | | | |
|---|---|---|---|
| 3,167,668 | 1/1965 | Nesh | 310/334 X |
| 3,498,500 | 3/1970 | Hansen | 222/23 |
| 3,586,889 | 6/1971 | Kolter | 310/334 X |
| 3,834,806 | 9/1974 | Whited . | |
| 3,896,279 | 7/1975 | Sugawara | 200/61.21 |
| 3,920,154 | 11/1975 | Sugawara | 222/23 |
| 3,920,155 | 11/1975 | Whited | 222/23 |
| 3,927,410 | 12/1975 | Pimbley | 310/334 X |
| 3,979,022 | 9/1976 | Whited | 222/23 |
| 4,159,786 | 7/1979 | Biddle, III et al. | 222/64 |
| 4,397,265 | 8/1983 | Terashima | 118/694 |
| 4,570,482 | 2/1986 | Murata et al. | 73/290 V |
| 4,620,783 | 11/1986 | Tanaka et al. | 355/326 X |
| 4,626,096 | 12/1986 | Ohtsuka et al. . | |
| 4,682,874 | 7/1987 | Fantuzzo . | |
| 4,947,788 | 8/1990 | Hill et al. | 118/653 |
| 4,956,668 | 9/1990 | Arnold et al. | 355/208 |
| 4,982,690 | 1/1991 | Funayama | 118/657 |
| 4,987,449 | 1/1991 | Katoh | 355/206 |
| 5,067,435 | 11/1991 | Hosaka | 118/653 |
| 5,081,498 | 1/1992 | Bares | 355/246 |

Primary Examiner—A. T. Grimley
Assistant Examiner—Thu Dang
Attorney, Agent, or Firm—Gary B. Cohen

[57] ABSTRACT

An improvement for a container disposed in a printing machine is disclosed. The container is adapted to dispense toner and capable of maintaining a quantity of toner therein. The improvement includes a sensor for sensing that the quantity of toner in the container is less than or equal to a predetermined quantity. The sensor is located in and isolated from the container by an isolating arrangement, the isolating arrangement preventing forces applied to the container from being transmitted to the sensor. In the preferred embodiment, the isolating arrangement includes a mechanism for damping movement of the sensor with respect to the container to decouple substantially the sensor from the container.

18 Claims, 4 Drawing Sheets

LEVEL SENSING APPARATUS

BACKGROUND OF THE INVENTION

1. Field of the Invention

This invention relates generally to a printing machine, and more particularly concerns a toner level sensing apparatus for detecting the presence or absence of particulate matter or liquid, such as toner, relative to a preselected level in a container.

2. Description of the Prior Art

Generally, in a printing process, such as an electrophotographic printing process, a photoconductive member is charged to a substantially uniform potential so as to sensitize the surface thereof. The charged portion of the photoconductive surface is exposed to a light image of an original document being reproduced. This records an electrostatic latent image on the photoconductive surface. After the electrostatic latent image is recorded on the photoconductive surface, the latent image is developed by bringing a developer mixture into contact therewith. A common type of developer mixture comprises carrier granules having toner particles adhering triboelectrically thereto. This two-component mixture is brought into contact with the photoconductive surface. The toner particles are attracted from the carrier granules to the latent image. This forms a toner powder image on the photoconductive surface, the toner powder image being transferred subsequently to a copy sheet. Finally, the toner powder image is heated to permanently fuse it to the copy sheet in image configuration.

A high speed commercial printing machine of this type uses a magnetic brush development arrangement for developing the latent image. The magnetic brush arrangement generally employs several developer rollers, disposed in a developer housing, for transporting the developer mixture closely adjacent to the photoconductive surface. Augers are usually used to mix and disperse developer materials throughout the developer housing.

In one exemplary magnetic brush arrangement, toner is conveyed to the developer housing by way of a feed system, the feed system including a toner supply bottle and a toner dispenser. The toner dispenser, which includes a housing or hopper, serves as an interface between the toner supply bottle and the the developer housing. After a given period of use, the toner in the toner supply bottle is dispensed, and the toner supply bottle is either replenished or replaced.

To determine when the toner in the toner supply bottle or hopper has dropped below a desired level, various known developing arrangements employ a level sensor, the level sensor being disposed in either the developer housing or the toner dispenser housing. The disclosures of the following patents may be relevant to various aspects of the level sensor of the present invention; U.S. Pat. No. 3,498,500 to Hansen issued Mar. 3, 1970; U.S. Pat. No. 3,834,806 to Whited issued Sep. 10, 1974; U.S. Pat. No. 3,896,279 to Sugawara issued Jul. 22, 1975; U.S. Pat. No. 3,920,154 to Sugawara issued Nov 18, 1975; U.S. Pat. No. 3,920,155 to Whited issued Nov. 18, 1975; U.S. Pat. No. 3,979,022 to Whited issued Sep. 7, 1976; U.S. Pat. No. 4,159,786 to Biddie,III et al. issued Jul. 3, 1979; U.S. Pat. No. 4,626,096 to Ohtsuka et al. issued Dec. 2, 1986.

U.S. Pat. No. 3,498,500 discloses a level sensing controller for determining the quantity of xerographic toner powder in a toner dispenser of an automatic xerographic reproducing machine. First and second electro-audio transducers are mounted on opposing ends of a toner dispenser housing. The second transducer is coupled to a threshold detecting circuit and is adapted to function as a receiver. An acoustical signal is transmitted by way of the first transducer. If the toner in the dispenser housing is below a preselected level, the signal is received at the second transducer and the detecting circuit is triggered.

U.S. Pat. No. 3,834,806 and U.S. Pat. No. 3,920,155 disclose a level indicating apparatus, a portion of which is mounted in a toner particle storage housing. The housing has a tubular member in which toner particles are capable of being stored. A planar member is suspended within the tubular member and the planar member is coupled to a magnetic pick-up. The magnetic pick-up senses the movement of the planar member when the planar member contacts toner particles. A low level signal is generated when the planar member is no longer in contact with the toner particles.

U.S. Pat. No. 3,896,279 describes a pair of opposed blades mounted on a rotor. The blades are supported by the toner in the housing. As the toner supply is depleted, the rotor pivots the blades toward the horizontal. When the blades reach the horizontal, a switch is actuated which, in turn, energizes a display to warn an operator of impending toner exhaustion.

U.S. Pat. No. 3,920,154 teaches a detector for sensing that the level of toner particles in a housing has dropped below a predetermined level. A flexible member extending across the reservoir actuates a switch in response to the toner level being below the predetermined level. The switch energizes a lamp warning the operator of this condition.

U.S. Pat. No. 4,159,786 discloses a toner level sensor including a cantilevered sensor rod mounted to a trough in which toner is capable of being stored. A decorator roll, having a plucking pin mounted thereto, is rotatably mounted in the trough. As the roll rotates the plucking pin contacts an end of the rod and causes the rod to vibrate. The frequency of the rod vibration varies as a function of the level of toner in the trough.

U.S. Pat. No. 4,682,874 discloses a detector positioned within an enclosure, the detector being adapted to sense the level of particles, such as toner, being advanced by a helical auger. The detector includes a switch having an elongated actuator arm, the actuator arm resting on the particles being advanced by the helical auger. When particles are being transported by the helical auger, the actuator arm is raised to an upward position for closing the switch. When the particles being transported are beneath a preselected level, the actuator arm moves downwardly to open the switch.

U.S. Pat. No. 4,626,096, in its "Background" section discloses a known sensor or piezo-electric element disposed in a toner hopper. The output of the piezo-electric element varies as a function of the weight applied to the element. When the level of the toner reaches a preselected level, the output of the element drops below a reference voltage and an indicating lamp is activated.

A number of the above-described detectors or sensors are not necessarily designed for convenience or compactness. That is, many of these detectors or sensors are not housed in an integrated package that can be installed, with a minimum amount of effort. Hence the manufacturing and installation costs associated with these sensors can be less than optimal. While the U.S. Pat. No. 4,682,874 detector is easy to manufacture and install, its application may be somewhat limited. In particular, the detector typically includes an arm that is positioned above the toner and adjacent the auger. For various toner enclosures, however, it may be undesirable to locate the level sensor adjacent the auger. Additionally, the noise immunity of at least some of these sensors can fall far short of being ideal. For example, the sensor rod of U.S. Pat. No. 4,159,786, is mounted to the tough and is therefore capable of being vibrated inadvertently whenever the trough is vibrated. Such Inadvertent vibration can generate false signals that indicate incorrectly a low toner state. Finally, the piezo-electric element discussed in U.S. Pat. No. 4,626,096, under certain circumstances, cannot sense accurately a low toner state. In particular, even when the overall level of toner in the hopper is low, the element will not sense that low level if the distribution of the toner is non-uniform and the sensor is covered by toner.

It would be desirable to provide a detector or sensor that is manufactured in a single low-cost unit, the low-cost unit being mounted readily in many different types of enclosures. Moreover, the sensor would be highly sensitive and accurate while possessing a great degree of noise immunity.

SUMMARY OF THE INVENTION

In accordance with the invention there is provided an improvement for a container adapted to store a quantity of toner. In one embodiment the container is used in a printing machine of the type from which toner is dispensable and in which the toner is maintainable in a quantity.. The improvement comprises means for sensing that the quantity of toner in the container is less than a predetermined quantity, the sensing means being disposed in the container. The sensing means is isolated from the container by isolating means, the isolating means being adapted to prevent forces applied to the container, from being transmitted to the sensing means.

In one aspect of the present invention, the sensing means comprises means for generating a signal, the signal varying in response to the quantity of toner being less than or equal to the predetermined quantity. In one example, the signal generating means includes first and second piezo-electric members, the second piezo-electric member being connected operatively to the first piezo-electric member. The isolating means preferably comprises a base having an elastomeric disposed therein. Ends of the piezo-electric members can be mounted in the elastomeric member so that the piezo-electric members are cantilevered relative to the base. Substantial portions of surfaces of the piezo-electric members can be covered with a non-stick layer, such as tetrafluoroethylene, to prevent the toner particles from adhering to the substantial portions of the piezo-electric members.

In the preferred form of operation, the first piezo-electric member is excited with an AC signal, so that both piezo-electric members begin to vibrate. The vibration is then converted into the signal varying in response to the quantity of toner being less than or equal to the predetermined quantity.

Numerous desirable features of the present invention will be apparent to those skilled in the art. For example, due to the arrangement used to isolate the sensing means from the container, the sensing means has relatively high noise immunity to false signals generated as a result of vibrations applied to the container. That is, the level sensing apparatus maximizes signal to noise ratio and thus affords a high degree of precise and accurate sensing.

Moreover, the sensing apparatus avoids "bridging" problems that occur as a result of the sensing means being in contact with the toner. In particular, as the quantity of toner in the container is depleted, the toner falls freely away from the non-stick coating of the surfaces of the piezoelectric members. Finally, the present level sensing apparatus is particularly cost-effective since it is designed efficiently and is easy to manufacture.

These and other aspects of the invention will become apparent from the following description used to illustrate a preferred embodiment of the invention read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 1:
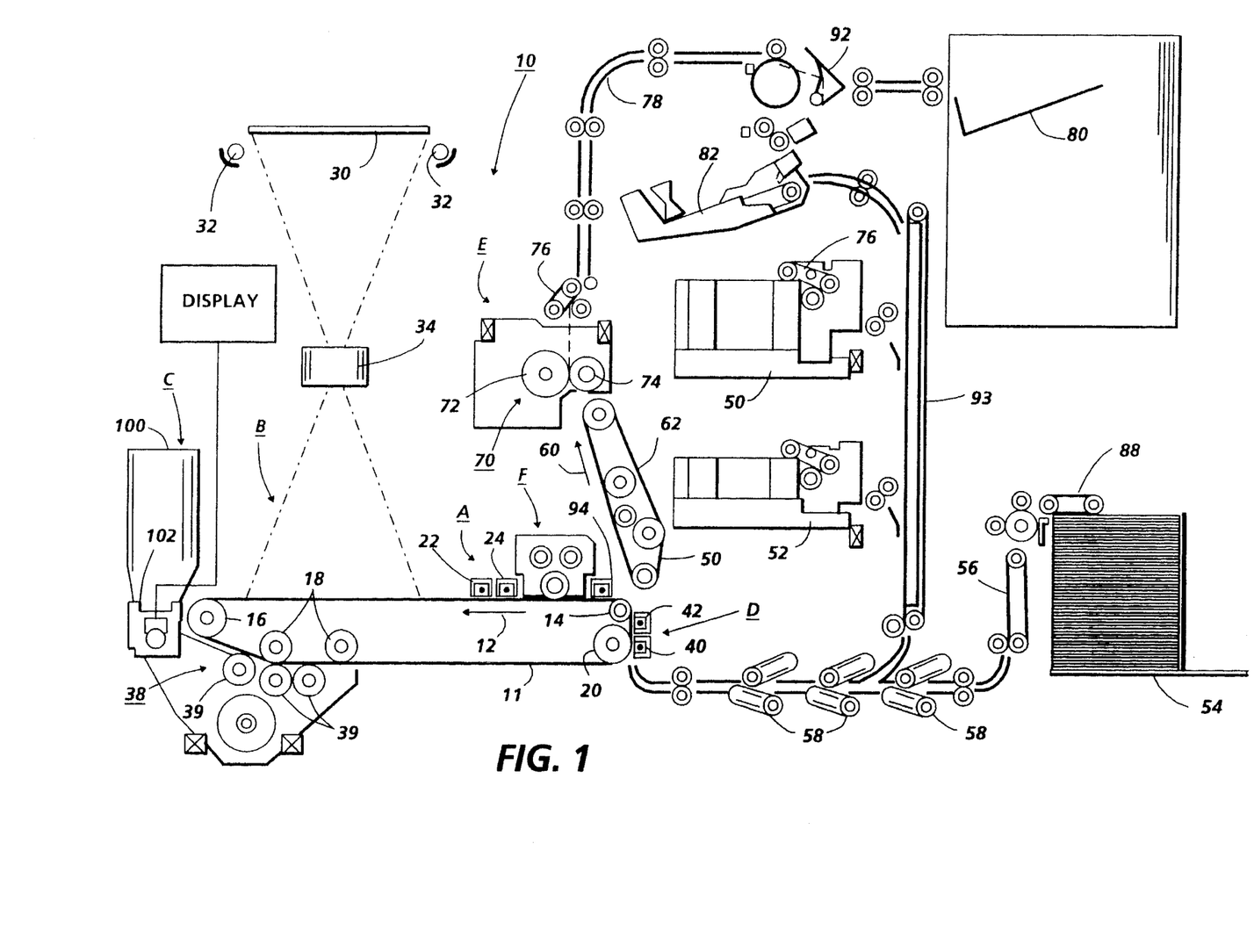
FIG. 1 is a schematic elevational view of an illustrative electrophotographic printing machine incorporating a toner level sensing apparatus having the features of the present invention therein.

For a general understanding of the features of the present invention, reference is made to the drawings. In the drawings, like references have been used throughout to designate identical elements. FIG. 1 depicts an electrophotographic printing machine 10 incorporating the features of the present invention therein. It will become evident from the following discussion that the present invention is equally well suited for use in a wide variety of printing machines, and is not necessarily limited in its application to the particular machine shown herein.

Referring now to FIG. 1, the various processing stations employed in the electrophotographic printing machine 10 will be described briefly. The electrophotographic printing machine 10 employs a photoreceptor belt 11, the belt 11 moving in the direction of arrow 12 to advance successive portions of the belt 11 sequentially through the various processing stations disposed about the path of movement thereof.

Belt 11 is entrained about stripping roller 14, tension roller 16, idler rollers 18, and drive roller 20. Drive roller 20 is coupled to a motor (not shown) by suitable means such as a belt drive. Belt 11 is maintained in tension by a pair of springs (not shown) resiliently urging tension roller 16 against belt 11 with the desired spring force. Both stripping roller 18 and tension roller 16 are rotatably mounted. These rollers are idlers which rotate freely as belt 11 moves in the direction of arrow 12.

With continued reference to FIG. 1, initially a portion of belt 11 passes through charging station A. At charging station A, a pair of corona devices 22 and 24 charge photoreceptor belt 11 to a relatively high, substantially uniform negative potential. At exposure station B, an original document is positioned face down on a transparent platen 30 for illumination with flash lamps 32. Light rays reflected from the original document are reflected through a lens 34 and projected onto a charged portion of photoreceptor belt 11 to dissipate selectively the charge thereon. This records an electrostatic latent image on the belt which corresponds to the informational area contained within the original document.

Thereafter, belt 11 advances the electrostatic latent image to development station C. At development station C, a magnetic brush developer unit 38 advances a developer mix (i.e. toner and carrier granules) into contact with the electrostatic latent image with magnetic brushes 39. The latent image attracts toner particles from the carrier granules thereby forming toner powder images on photoreceptor belt 11.

Belt 11 then advances the developed latent image to transfer station D. At transfer station D, a sheet of support material such as paper copy sheet is moved into contact with the developed latent images on belt 11. First, the latent image on belt 11 is exposed to a pre-transfer light from a lamp (not shown) to reduce the attraction between photoreceptor belt 11 and the toner powder image thereon. Next corona generating device 40 charges the copy sheet to the proper potential so that it is tacked to photoreceptor belt 11 and the toner powder image is attracted from photoreceptor belt 11 to the sheet. After transfer, a corona generator 42 charges the copy sheet to an opposite polarity to detack the copy sheet from belt 11, whereupon the sheet is stripped from belt 11 at stripping roller 14.

Sheets of substrate or support material are advanced to transfer station D from supply trays 50, 52 and 54, which may hold different quantities, sizes and types of support materials. Sheets are advanced to transfer station D along conveyor 56 and rollers 58. After transfer, the sheet continues to move in the direction of arrow 60 onto a conveyor 62 which advances the sheet to fusing station E.

Fusing station E includes a fuser assembly, indicated generally by the reference numeral 70, which permanently affixes the transferred toner powder images to the sheets. Preferably, fuser assembly 70 includes a heated fuser roller 72 adapted to be pressure engaged with a back-up roller 74 with the toner powder images contacting fuser roller 72. In this manner, the toner powder image is permanently affixed to the sheet.

After fusing, copy sheets bearing fused images are directed through decurler 76. Chute 78 guides the advancing sheet from decurler 76 to catch tray 80 or a finishing station for binding, stapling, collating etc., and removal from the machine by the operator. Alternatively, the sheet may be advanced to a duplex tray 82, via duplex gate 92, and then returned to the processor and conveyor, via paper feeding transport 93.

A pre-clean corona generating device 94 may be provided for exposing the residual toner and contaminants to positive charges to thereby narrow the charge distribution thereon for more effective removal at rotating electrostatic brush cleaning station F. It is contemplated that residual toner remaining on photoreceptor belt 11 after transfer will be reclaimed and returned to the developer station C by any of several well known reclaim arrangements, and in accordance with the present invention, described below.

Figure 2:
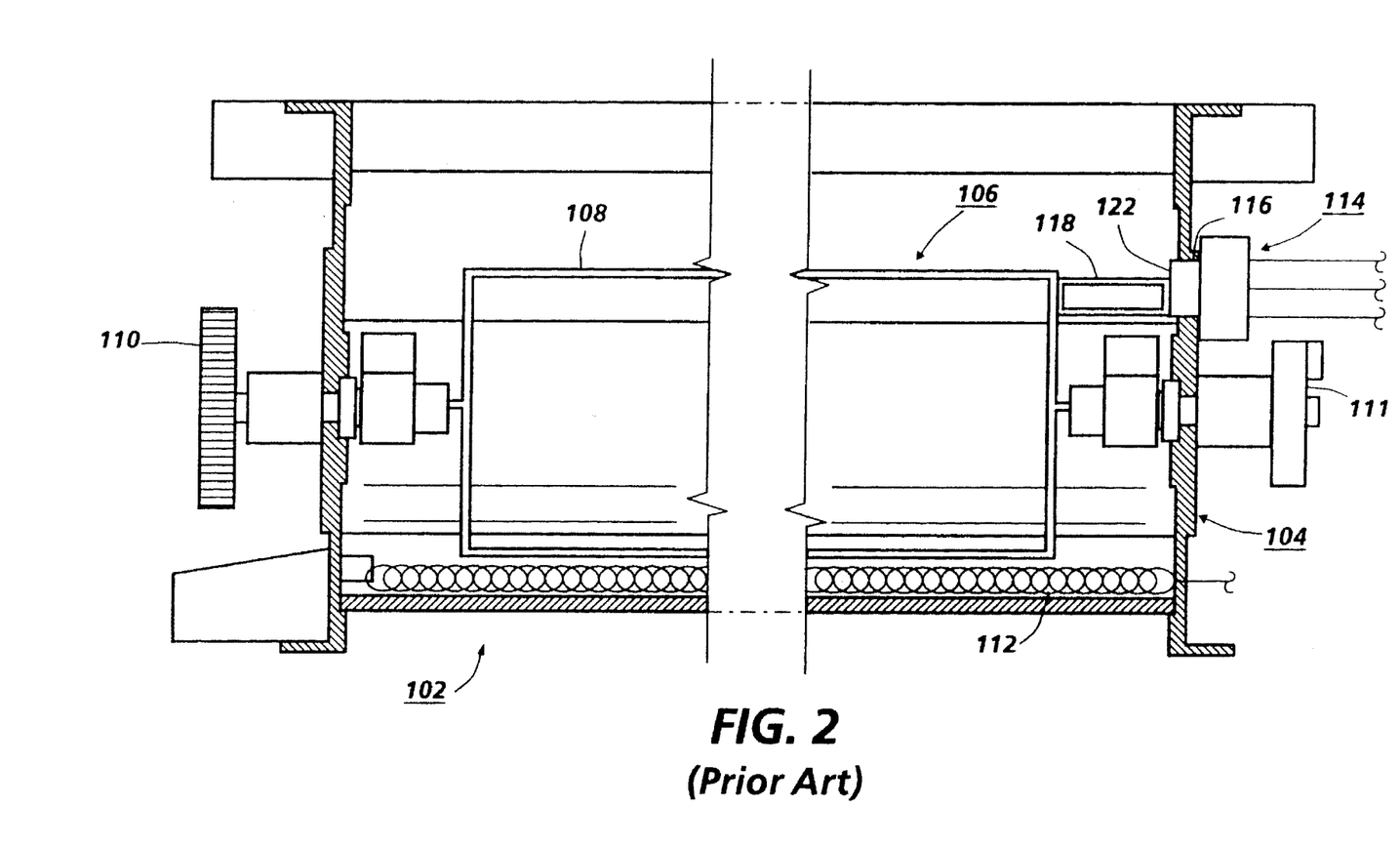
FIG. 2 is an elevational, partially sectional view of a known toner dispensing device having a known level sensor mounted therein.

Referring still to FIG. 1, toner is fed to the magnetic brush developer unit 38 by way of a toner supply bottle 100 and dispenser 102, the toner supply bottle 100 being mounted detachably to the dispenser 102. Referring now to FIG. 2, a known embodiment of the dispenser 102 is shown. The dispenser 102 includes a hopper 104, the hopper 104 being adapted to receive toner from the toner supply bottle 100. The toner is maintained in particulate form through use of an agitator assembly 106, the agitator assembly 106 including an agitator wire 108 coupled with at least one drive wheel 110. In one example, an irregular cam 111 is coupled to one side of the agitator wire 108. The cam 111 is positioned adjacent a "thumping arm" (not shown), the arm functioning as a cam follower that strikes the wall of the hopper 104 periodically as the cam 111 is rotated. The toner is removed from the hopper 104 by use of an auger, such as spring assembly 112.

A sensor 114 is mounted in an aperture 116 of the hopper 104. An anti-bridging wire 118 is mounted along the side of the agitator wire 108, and toner is removed from a surface of the sensor 114 periodically as the agitator wire 108 is rotated. Operation of the dispenser 102 is well known to those skilled in the art and need not be explained herein.

Figures 3, 4, 6, 7:
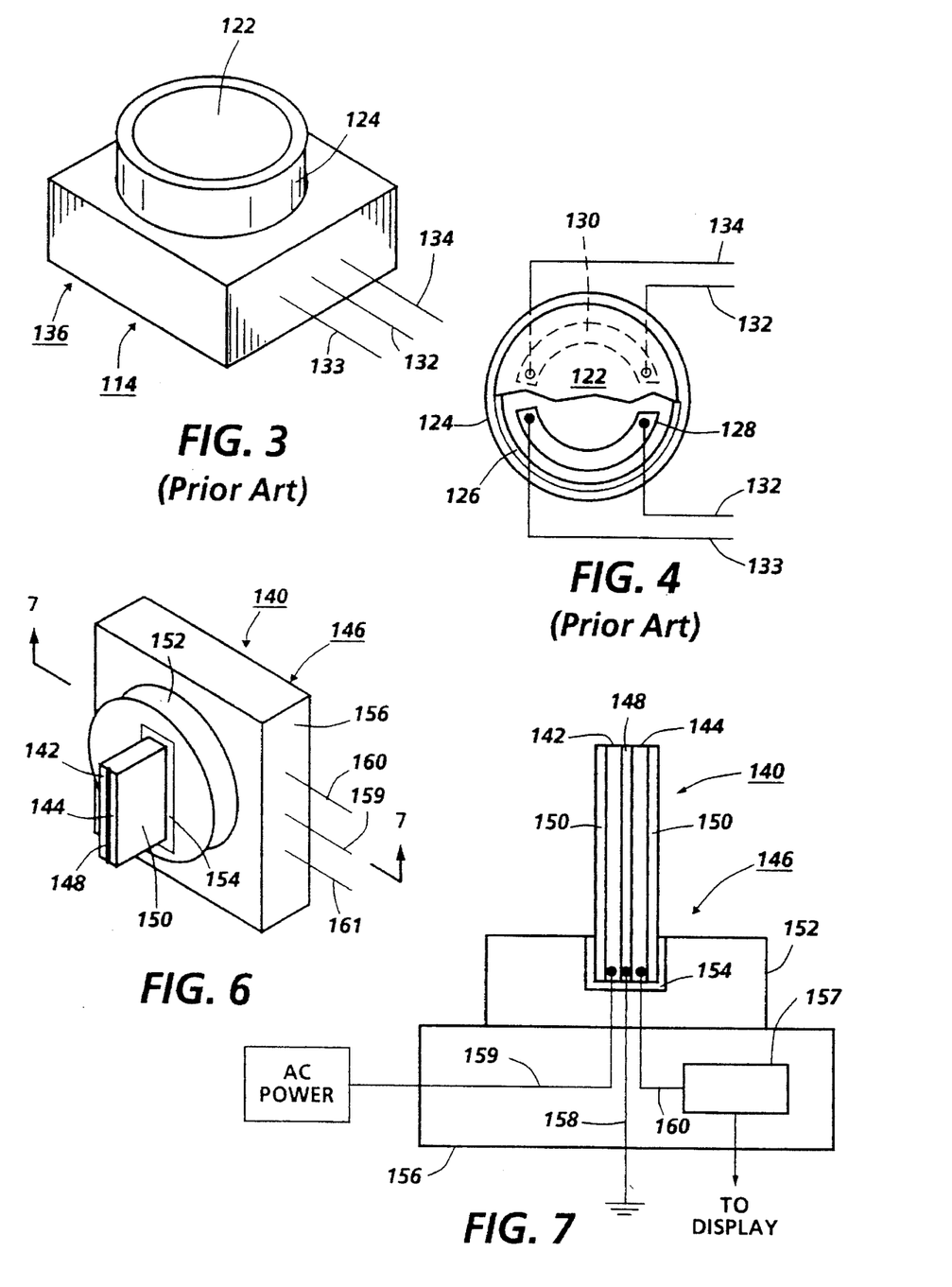
FIG. 3 is a perspective view of the FIG. 2 sensor.
FIG. 4 is a partially broken-away, plan view of the FIG. 3 sensor.
FIG. 6 is a perspective view of the FIG. 5 sensor.
FIG. 7 is a sectional, elevational view taken along plane 6—6 in the direction of the arrows.

Referring to FIGS. 3 and 4, the structure of the sensor 114 is shown in further detail. The sensor 114 includes a beryllium/copper disk 122 which is secured between a wall 124 and on a ledge 126. As best illustrated in FIG. 4, piezoelectric members 128 and 130 are mounted on an underside of disk 122. Leads 132–134 are connected operatively to ends of the members 128 and 130. Leads 132 are connected to ground, while leads 133 and 134 are connected to an AC power source and an amplifying/logic circuit (not shown), respectively. In the preferred embodiment, the amplifying/logic circuit is disposed in the base 136 of the sensor 114. As will be appreciated by those skilled in the art, the circuitry for amplifying and logically processing the types of signals received by the piezo-electrical member 130 is conventional In particular, determining whether the signal received by the piezo-electric member 130 exceeds a preselected threshold voltage, current or frequency can be accomplished by use of one of various known arrangements of analog and digital components.

In operation, the piezo-electric member 128 is excited by the AC power source so that a signal is generated by the piezo-electric member 128. The signal is then transmitted across the beryllium/copper disk 122 to the piezo-electric member 130 for reception thereat. If the hopper 104 is sufficiently filled with toner, the signal received at the piezo-electric member 130 is damped significantly so that its frequency is relatively low. Accordingly, no triggering signal is generated by the amplifying/logic circuit. On the other hand, when the level of toner in the hopper 104 drops below a certain level, the frequency of the signal received at the piezo-electric member 130 exceeds a threshold level. Accordingly, when the signal exceeds the preselected threshold level, a triggering signal is outputted by the amplifying/logic circuit to indicate that the toner supply bottle 100 requires replenishing or replacing. This triggering signal can be transmitted to a conventional display apparatus, or the like, for informing the user of a low toner level state.

Under ideal operating conditions, the sensor 114 is well suited for its intended purpose; however, under actual operating conditions, the amount of error generated by the sensor 114 can be unacceptable. In particular, the disk 122 is positioned above a hollow cavity and, is therefore, structurally analogous to a "drum." Moreover, the disk 122 is operatively mounted to, and therefore in communication with, a wall of the hopper 104. Consequently, when the hopper 104 is subjected to vibration, from, for example, the printing machine 10, the disk 122 can vibrate in a manner similar to that of a cloth stretched tautly over a hollow barrel, or resonate at its natural frequency. In response to the vibrating, false signals are received by the piezo-electric member 130 and the triggering signal is outputted from the amplifying/logic circuit, even though the toner level is not low. It will also be appreciated that satisfactory operation of the sensor 114 cannot be achieved without the use of the anti-bridging wire 118. That is, unless the surface of the disk 122 exposed to the toner is wiped periodically toner will stick to the exposed surface and impair severely the ability of the sensor to detect low toner levels.

Figure 5:
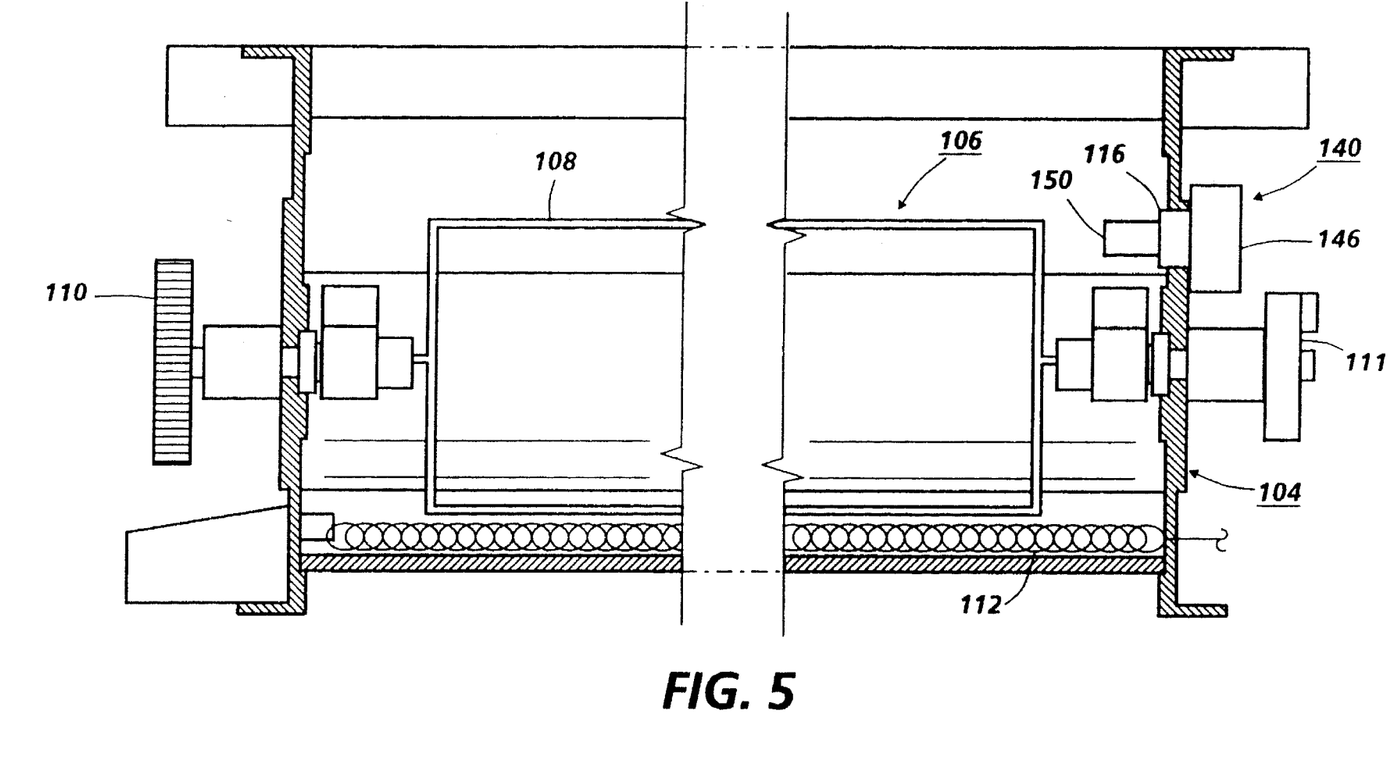
FIG. 5 is an elevational, partially sectional view of a known toner dispensing device having a level sensing apparatus of the present invention mounted therein.

Referring to FIGS. 5–7, a sensor which avoids the above discussed difficulties is indicated by the numeral 140. In the illustrated embodiment of FIG. 5, the sensor 140 is mounted in a wall of the hopper 104, but in other contemplated embodiments the sensor 140 could be mounted in another container, such as the magnetic brush developer unit 38 or the toner supply bottle 100. Referring specifically to FIG. 7, the sensor 140, having piezo-electrical members 142 and 144, is shown mounted in an isolating arrangement or base 146. In the preferred embodiment, the piezo-electrical members 142, 144 are wafer-thin slices cut from a block of compressed ceramic powder. The sensor 140 is similar to a sensor manufactured by Motorola, Inc., the Motorola sensor having the model number 130P60657 and operating at 24 volts.

Inner surfaces of the members 142, 144 are separated from and connected operatively to one another by an adhesive layer 148. The layer 148 is a suitable insulative material manufactured by Motorola. The outer surfaces of the members 142, 144, are covered with a non-stick coating or layer, such as tetrafluoroethylene, a material sold under the registration "Teflon," to E. I. DuPont de Nemours & Company. Ends of the members 142, 144, are mounted, in cantilever-fashion, in an upper portion 152 of the base 146. The upper portion 152 includes a trough 154, the trough 154 being filled with an elastomeric material, such as silicone or like material. It should be recognized that the silicone-filled trough 154 serves to damp movement of the the piezo-electric members 142,144 with respect to the hopper 104. Consequently, piezo-electric members 142,144 are decoupled substantially from the hopper 104. Except for the volume occupied by trough 154, the upper portion 152 can be substantially solid. Vibration in the elastomeric-filled trough 154 is further minimized when the volume surrounding the trough 154 is solid, rather than hollow. A lower portion 156 of base 146 houses amplifying/logic circuit 157 of the type indicated above in the discussion of sensor 114. Line 158 is connected to ground while lines 159–160 are connected respectively to an AC power source and the amplifying/logic circuit 157.

In the preferred form of operation, piezo-electrical member 142 is excited with an AC signal such that the members 142, 144 function as a signal generator, the signal generator being structurally equivalent to a bimorph cell. Accordingly, the members 142,144 vibrate in unison, and the physical motion of the vibration is converted into a signal having an amplitude and frequency, both of which amplitude and frequency correspond to the extent of vibration. The signal is generated at the piezoelectric member 144, and transmitted to the amplifying/logic circuit.

In one example, the amount of toner in the hopper 104 drops below a predetermined quantity, and the members 142, 144 vibrate, in substantial part, as a function of the the applied AC signal, so that the frequency of the signal is undamped. Conversely, when the quantity of the toner is equal to or greater than the predetermined quantity, the frequency of the signal, is damped. As will be appreciated by those skilled in the art, when the signal is damped or undamped sufficiently, the amplifying/logic circuit 157 can be used to develop a triggering signal, in a manner similar to that discussed above for sensor 114.

Additionally, toner accumulation on surfaces of the members 142, 144 is alleviated since the members 142, 144 are in constant motion, and are isolated from the toner by the non-stick layer 150. That is, the vibration of the piezo-electric members prevents sticking of toner thereto.

It is, therefore, evident that there has been provided in accordance with the present invention, a level sensor that fully satisfies the gains and advantages set forth above. While this invention has been described in conjunction with a specific embodiment thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A container adapted to store a quantity of toner comprising:

means for sensing that the quantity of the toner in said container is less than a predetermined quantity, said sensing means being disposed in said container; and means for mechanically isolating and decoupling said sensing means from said container to prevent mechanical forces applied to said container from being transmitted to said sensing means.

2. A container according to claim 1, wherein said sensing means senses that the quantity of toner in said container is at least equal to the predetermined quantity.

3. A container adapted to store a quantity of toner comprising:

means for sensing that the quantity of the toner in said container is less than a predetermined quantity, said sensing means being disposed in said container; and means for isolating said sensing means from said container to prevent forces applied to said container from being transmitted to said sensing means, wherein said isolating means comprises means for damping movement of said sensing means with respect to the container to decouple substantially said sensing means from said container, said isolating means being disposed intermediate of said sensing means and said container.

4. A container according to claim 3, wherein said damping means comprises an elastomeric material disposed intermediate of said sensing means and said container.

5. A container adapted to store a quantity of toner, comprising:

means for sensing that the quantity of the toner in said container is less than a predetermined quantity, said sensing means being disposed in said container, wherein said sensing means comprises a first ceramic piezo-electric member having first and second opposing ends, and wherein said sensing means comprises a second ceramic piezo-electric member having first and second opposing ends; and means for isolating said sensing means from said container to prevent forces applied to said container from being transmitted to said sensing means, said isolating means comprising means for damping movement of said sensing means with respect to said container to decouple substantially said sensing means from said container, said isolating means being disposed intermediate of said sensing means and said container, said damping means comprising an elastomeric material disposed intermediate of said sensing means and said container, wherein said isolating means further comprises a base having said elastomeric material disposed therein, said elastomeric material surrounding said first ends of said first and second ceramic piezo-electric members, and wherein said first ends of said first and second ceramic piezo-electric members are mounted in said base so that said first and second ceramic piezo-electric members are cantilevered relative to said base.

6. A container according to claim 3, wherein said sensing means includes means for generating a signal, said signal varying in response to the quantity of toner being less than the predetermined quantity.

7. A container adapted to store a quantity of toner, comprising:

means for sensing that the quantity of the toner in said container is less than a predetermined quantity, said sensing means being disposed in said container, wherein said sensing means includes means for generating a signal, said signal varying in response to the quantity of toner being less than the predetermined quantity, and wherein said signal generating means comprises:

a plurality of piezo-electric members being configured as a bimorph cell, said plurality of piezo-electric members being cantilevered relative to said container, said plurality of piezo-electric members being adapted to be vibrated in unison when a portion thereof is excited by an AC signal, and wherein the vibration of said piezo-electric members is substantially proportional to said signal varying in response to the quantity of toner being less than the predetermined quantity; means for isolating said sensing means from said container to prevent forces applied to said container from being transmitted to said sensing means, said isolating means comprising means for damping movement of said sensing means with respect to the container to decouple substantially said sensing means from said container, said isolating means being disposed intermediate of said sensing means and said container.

8. A container adapted to store a quantity of toner, comprising:

means for sensing that the quantity of the toner in said container is less than a predetermined quantity, said sensing means being disposed in said container, wherein said sensing means includes first and second ceramic piezo-electric members, said second piezo-electric member being connected operatively to said first piezo-electric member, and wherein said container further comprising a non-stick layer covering substantial portions of surfaces of said first and second ceramic piezo-electric members, said non-stick layer being capable of preventing the toner from adhering to said substantial portions of surfaces; and means for isolating said sensing means from said container to prevent forces applied to said container from being transmitted to said sensing means, said isolating means comprising means for damping movement of said sensing means with respect to said container to decouple substantially said sensing means from said container, said isolating means being disposed intermediate of said sensing means and said container.

9. A container according to claim 8, wherein said non-stick layer comprises tetrafluoroethylene.

10. In a container for a printing machine, said container being of the type from which toner is dispensable and in which the toner is maintainable in a quantity, the improvement comprising:

means for sensing that the quantity of the toner in said container is less than a predetermined quantity, said sensing means being disposed in said container; and means for mechanically isolating and decoupling said sensing means from said container to prevent mechanical forces applied to said container from being transmitted to said sensing means.

11. A container for a printing machine according to claim 10, wherein said sensing means senses that the quantity of toner in said container is at least equal to the predetermined quantity.

12. In a container for a printing machine of the type from which toner is dispensable and in which the toner is maintainable in a quantity, the improvement comprising:

means for sensing that the quantity of the toner in said container is less than a predetermined quantity, said sensing means being disposed in said container; and means for isolating said sensing means from said container to prevent forces applied to said container from being transmitted to said sensing means, wherein said isolating means comprises means for damping movement of said sensing means with respect to the container to decouple substantially said sensing means from said container, said isolating means being disposed intermediate of said sensing means and said container.

13. A container for a printing machine according to claim 12, wherein said damping means comprises an elastomeric material disposed intermediate of said sensing means and said container.

14. In a container for a printing machine, said container being of the type from which toner is dispensable and in which the toner is maintainable in a quantity, the improvement comprising:

means for sensing that the quantity of the toner in said container is less than a predetermined quantity, said sensing means being disposed in said container, wherein said sensing means comprises a first ceramic piezo-electric member having first and second opposing ends, and wherein said sensing means comprises a second ceramic piezo-electric member having first and second opposing ends; and means for isolating said sensing means from said container to prevent forces applied to said container from being transmitted to said sensing means, said isolating means comprising means for damping movement of said sensing means with respect to said container to decouple substantially said sensing means from said container, said isolating means being disposed intermediate of said sensing means and said container, said damping means comprising an elastomeric material disposed intermediate of said sensing means and said container, wherein said isolating means further comprises a base having said elastomeric material disposed therein, said elastomeric material surrounding said first ends of said first and second ceramic piezo-electric members, and wherein said first ends of said first and second ceramic piezo-electric members are mounted in said base so that said first and second ceramic piezo-electric members are cantilevered relative to said base.

15. A container for a printing machine according to claim 12, wherein said sensing means includes means for generating a signal, said signal varying in response to the quantity of toner being less than the predetermined quantity.

16. In a container for a printing machine, said container being of the type from which toner is dispensable and in which the toner is maintainable in a quantity, the improvement comprising:

means for sensing that the quantity of the toner in said container is less than a predetermined quantity, said sensing means being disposed in said container, wherein said sensing means includes means for generating a signal, said signal varying in response to the quantity of toner being less than the predetermined quantity, and wherein said signal generating means comprises:

a plurality of piezo-electric members being configured as a bimorph cell, said plurality of piezo-electric members being cantilevered relative to said container, said plurality of piezo-electric members being adapted to be vibrated in unison when a portion thereof is excited by an AC signal, and wherein the vibration of said piezo-electric members is substantially proportional to said signal varying in response to the quantity of toner being less than the predetermined quantity;

means for isolating said sensing means from said container to prevent forces applied to said container from being transmitted to said sensing means, said isolating means comprising means for damping movement of said sensing means with respect to the container to decouple substantially said sensing means from said container, said isolating means being disposed intermediate of said sensing means and said container.

17. In a container for a printing machine, said container being of the type from which toner is dispensable and in which the toner is maintainable in a quantity, the improvement comprising:

means for sensing that the quantity of the toner in said container is less than a predetermined quantity, said sensing means being disposed in said container, wherein said sensing means includes first and second ceramic piezo-electric members, said second piezo-electric member being connected operatively to said first piezo-electric member, and wherein the improvement further comprising a non-stick layer covering substantial portions of surfaces of said first and second ceramic piezo-electric members, said non-stick layer being capable of preventing the toner from adhering to said substantial portions of surfaces; and means for isolating said sensing means from said container to prevent forces applied to said container from being transmitted to said sensing means, said isolating means comprising means for damping movement of said sensing means with respect to said container to decouple substantially said sensing means from said container, said isolating means being disposed intermediate of said sensing means and said container.

18. A container for a printing machine according to claim 17, wherein said non-stick layer comprises tetrafluoroethylene.

* * * * *